United States Patent
Siri (10) Patent No.: US 7,151,362 B1
(45) Date of Patent: Dec. 19, 2006

(54) UNIFORM CONVERTER OUTPUT VOLTAGE DISTRIBUTION POWER SYSTEM

(75) Inventor: Kasemsan Siri, Torrance, CA (US)

(73) Assignee: The Aerospace Corporation, El Segundo, CA (US)

(*) Notice: Subject to any disclaimer, the term of this patent is extended or adjusted under 35 U.S.C. 154(b) by 61 days.

(21) Appl. No.: 11/145,336

(22) Filed: Jun. 3, 2005

(51) Int. Cl.
*G05F 1/40* (2006.01)

(52) U.S. Cl. .................................................. 323/271

(58) Field of Classification Search ................ 323/271, 323/272, 268
See application file for complete search history.

(56) References Cited

U.S. PATENT DOCUMENTS 4,999,760 A * 3/1991 Tietema ........................ 363/53

* cited by examiner

*Primary Examiner*—Shawn Riley
(74) *Attorney, Agent, or Firm*—Derrick Michael Reid

(57) ABSTRACT

A uniform converter output voltage distribution power system evenly controls the individual output voltages of DC-to-DC parallel-input series-output connected converters using a uniform output voltage distribution controller including a generator for generating respective error signals from the converter output voltages using a common distribution reference signal for providing respective converter control signals connected to the converters through respective shared-bus controls for evenly distributing the power delivered by the converters that are shared-bus current-mode converters for preferably providing high output voltages. Employing a common regulation control signal, the controller can also provide system output voltage regulation, system input current limiting, proportional-voltage control, relaxed voltage uniformity, and fault-tolerant power control.

12 Claims, 6 Drawing Sheets

UNIFORM CONVERTER OUTPUT VOLTAGE
DISTRIBUTION POWER SYSTEM

UNIFORM CONVERTER OUTPUT VOLTAGE
DISTRIBUTION POWER SYSTEM

FIG. 1

GENERALIZED UNIFORM OUTPUT
VOLTAGE DISTRIBUTION CONTROLLER

FIG. 2A

RELAXED UNIFORM OUTPUT VOLTAGE
DISTRIBUTION CONTROLLER

GENERALIZED UNIFORM OUTPUT VOLTAGE
DISTRIBUTION ERROR SIGNAL GENERATOR

FIG. 3A

PROPORTIONAL OUTPUT VOLTAGE
DISTRIBUTION ERROR SIGNAL GENERATOR

FIG. 3B

UNIFORM CONVERTER OUTPUT VOLTAGE DISTRIBUTION POWER SYSTEM

FIELD OF THE INVENTION

The invention relates to the field of power systems. More particularly, the invention relates to uniform voltage distribution of parallel-input series-output connected converters in power systems.

BACKGROUND OF THE INVENTION

Power systems with parallel-inputs and parallel-output configurations are used to provide electrical power using DC-to-DC power converters. In such systems, uniform current distribution control is solved by using manufacturer-provided parallel control ports with user-developed shared-bus control topology. Using shared-bus configurations, a control voltage commands the parallel-connected converters to operate as voltage-controlled current-sources, that is, as current mode converters where each converters is controlled as a voltage controlled current source. The current-mode and shared-bus approach to uniform current distribution is well known, particularly for parallel-input parallel-output connected power converters.

Another conventional practice in power systems, is to used the DC-to-DC converters in parallel-connected configurations where the converters are specified to be identical for uniform power distribution amongst the converters. In stand-alone configurations, the converters are often connected to the same input voltage source while the outputs of the converters independently distribute output voltages to individual loads. One problem with stand-alone converters is that internal component variations result in undesirable non-uniform output voltage distribution despite the parallel connection of the converters to the same input voltage source. The stand-alone converters need to have electrical isolation between the converter inputs and outputs to enable the outputs to be series connected. When these stand-alone converters are connected in a parallel-input and series-output configuration, non-uniformity in the output voltages of the converters results with uneven power distribution such that some converters may be overstressed while the remaining converters are not. Uneven distributed voltages can cause the converters to lose stability and can cause one or more of the converters to deliver an excessive portion of the output power across a common load. With excessive uneven power distribution, system reliability degrades mostly due to the result of thermal overstress to the converters that contribute a greater portion of the output power. Connecting the outputs of the converters in series cannot avoid uneven power distribution. Uneven power distribution occurs as a result of internal component mismatches among the series-output connected converters. The problems associated with non-uniform power distribution are not entirely eliminated even with external controls that conventionally do not have dedicated closed-loop regulation for output voltage distribution.

When parallel-input series-output converters are operated in a current mode, mismatches in component values can still lead to uneven power distribution as well as different modes of operations. Among the nearly identical parallel-input and series-output connected converters, some converters may operate in over-current protection mode and some converters in normal output voltage regulation mode while the remaining converters operate in over-voltage protection mode. A problem with parallel-input and series-output connected converters is that the output voltages are not all tied to ground, and hence the converter output voltages cannot be directly used by controllers to separately and precisely regulate each of the converters. A problem with existing parallel-input and series-output converters power system is the inability to precisely control the proper distribution of power. Without precise power distribution among the converters, voltage output regulation is degraded and undesirable uneven input current sharing and power distribution can result. Subsequently, undesirable interactions among interconnected converters may exist and can result in regulation instability as well as overstress in one or more of the parallel-input and series-output connected converters. One problem of parallel-input and series-output power systems using multiple converters is the output voltage of each converter is not the same, and hence is non-uniform resulting in instability and uneven power distribution, particularly during any transient start-up, step-line, or step-load transients.

Another problem with parallel-input and series-output connected converter power systems is the lack of a properly unified control for uniform or proportional output voltage distribution for precise distribution of control signals to the converters so as to meet the control objectives for the system, such as, system output voltage protection and system input current-limiting while actively sustaining uniform or proportional output voltages of the converters at all times. The lack of proper control for proportional power distribution among non-identical parallel-input and series-output DC-to-DC converters and proportional-to-power output-voltage limits the use of a mix of converters that have different output voltage and power ratings in a parallel-input and series-output power system. These and other disadvantages are solved or reduced using the invention.

SUMMARY OF THE INVENTION

An object of the invention is to provide uniform output voltage distribution among parallel-input series output DC-to-DC converters in a power system.

Another object of the invention is to provide uniform output voltage distribution among parallel-input series output DC-to-DC converters in a power system having proportional converter control.

Yet another object of the invention is to provide uniform output voltage distribution among parallel-input series output DC-to-DC converters in a power system having fault tolerance.

Still another object of the invention is to provide uniform output voltage distribution among parallel-input series output DC-to-DC converters in a power system having output voltage regulation.

A further object of the invention is to provide uniform output voltage distribution among parallel-input series output DC-to-DC converters in a power system having input line current-limiting.

Yet a further object of the invention is to provide uniform output voltage distribution among parallel-input series output DC-to-DC converters in a power system having relaxed control where one of the converters has a non-uniform output voltage compared to the remaining uniform output voltage converters.

The invention is directed to a uniform output voltage distribution power system with parallel-input series-output connected converters control by a uniform output voltage distribution controller for controlling the output voltage of each of the converters to be the same so that power contribution by the converters is even. The distribution controller particularly includes an error signal generator for generating error signals that are produced from the converter output voltages. Successive single-ended output voltage levels from successive converters are differenced for creating difference signals equal to the individual converter output voltages so as to reconstruct, in the error signal generator, the sensed converter output voltages relative to ground. The reconstructed converter output voltages can then be compared to a distribution reference signal for generating separate converter control signals for separate control and regulation of the individual converters. In the error signal generator, a common distribution reference signal is compared to each of the reconstructed output voltages for producing respective error signals. The error signals are used to then form converter control signals for the respective converters using a shared-bus control input (SBI) port of the converters for maintaining uniform output voltage distribution. The common distribution reference signal establishes the power distribution among the converters while the error signals are used to drive the respective converters toward the uniform output voltage distribution. In a proportion configuration, the distribution reference signal can be varied for each converter so as to provide proportional power distribution between the converters. In a relaxed-control configuration, one of the converters can be controlled by only either the output voltage regulation or the input current-limiting controller while the remaining converters are controlled by both the output voltage regulation or input current-limiting controller and the voltage distribution error signal generator. The overall controller is preferably adapted to concurrently provide system output voltage regulation or input current limiting while sustaining uniform distribution of the converter output voltages.

The uniform output voltage distribution controller power system operates in a current-mode using shared-bus converters configured as parallel-input and series-output converters with improved stability and uniform output voltage distribution among the converters through output voltage distribution control. The power system can be expanded to a higher output voltage power system consisting of nearly identical converters that are designed to operate as either stand-alone converters or parallel-connected converters. The power system has minimized interactions among converters because the converters are separately controlled for eliminating transient oscillation during current sharing at the converter input. The power system can be adapted to further provide proportional control for converters that have different output voltage ratings. The power system can provide system input and output current limiting. The power system can provide output voltage regulation. The power system can provide relaxed control when one converter may not need to be directly controlled for the uniform output voltage distribution as the remaining converters that are tightly controlled for the uniform distribution. Fault-tolerant parallel-input series-output converters preserve uniform output voltages even though one or more converter may fail to produce an output voltage. These and other advantages will become more apparent from the following detailed description of the preferred embodiment.

DETAILED DESCRIPTION OF THE PREFERRED EMBODIMENT

Figure 1:
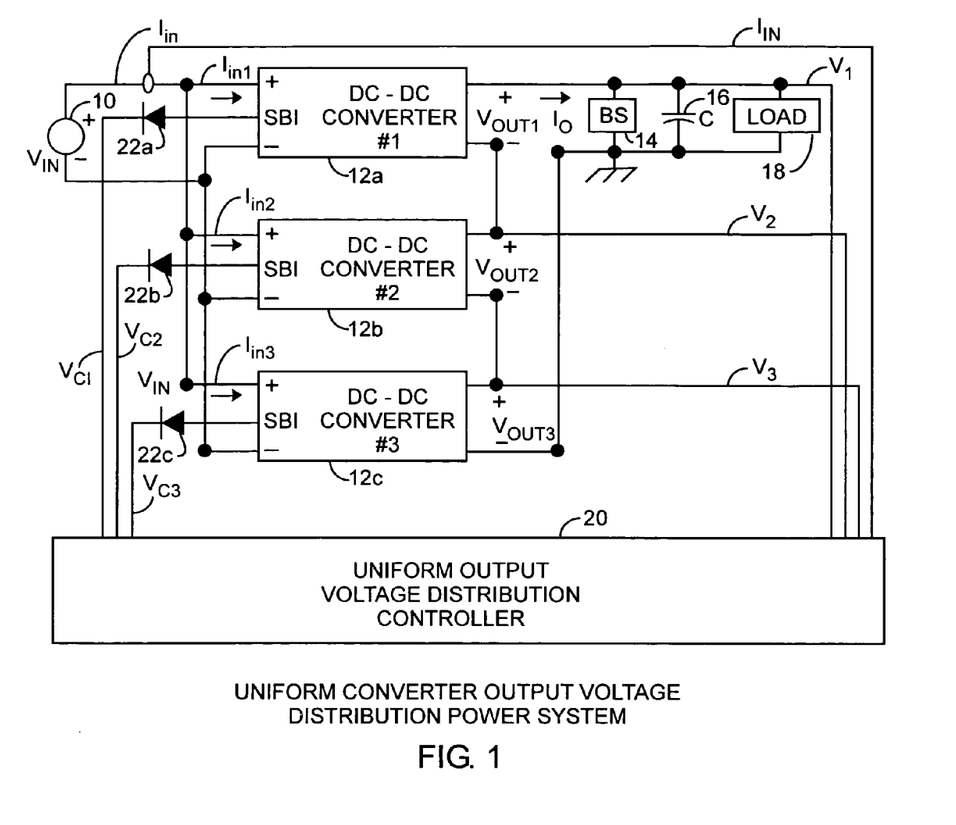
FIG. 1 is a schematic of a uniform converter output voltage distribution power system.

An embodiment of the invention is described with reference to the figures using reference designations as shown in the figures. Referring to FIG. 1, a uniform converter output voltage distribution power system receives power from a DC voltage source 10 providing $I_{in}$ input current that is sensed as $I_{IN}$ delivered to a plurality of DC-to-DC converters, such as three converters 12a, 12b, and 12c, that are connected in a parallel-input series-output configuration. The converters 12a, 12b, and 12c produce output voltages $V_{out1}$, $V_{out2}$, and $V_{out3}$, respectively that are series connected to a bias stabilizer 14, load capacitance 16 and a load 18. The output voltages $V_{out1}$, $V_{out2}$, and $V_{out3}$ are controlled to be equal for providing uniform voltage and hence uniform power to the load 18. The output voltages $V_{out1}$, $V_{out2}$, and $V_{out3}$ have positive terminals available for providing output voltage levels $V_1$, $V_2$, and $V_3$ respectively that are fed to a uniform output voltage distribution controller 20. The distribution controller 20 provides respective control voltages $V_{C1}$, $V_{C2}$, and $V_{C3}$ to shared-bus input controls SBI for each of the converters 12a, 12b, and 12c, through respective diodes 22a, 22b, and 22c. The distribution controller 20 controls the power distribution of the converters 12a, 12b, and 12c to be equal with equal input currents $I_{in1}$, $I_{in2}$, and $I_{in3}$ as well as equal output voltages $V_{out1}$, $V_{out2}$, and $V_{out3}$.

The parallel-input and series-output converter power system provides uniform converter output voltage distribution control of each of the DC-to-DC converters using the respective shared-bus control inputs. Any number of parallel-input series-output connected converters can be used having shared-bus inputs. The converters are operated in current mode. Each of the converters 12a, 12b, and 12c can operate as a stand-alone current-mode converter. The output voltages of the interconnected converters 12a, 12b, and 12c are fed to the voltage distribution controller 20 that provides the uniform output voltage distribution control function. The controller 20 may also provide for output voltage regulation and input current limiting.

Figure 2A:
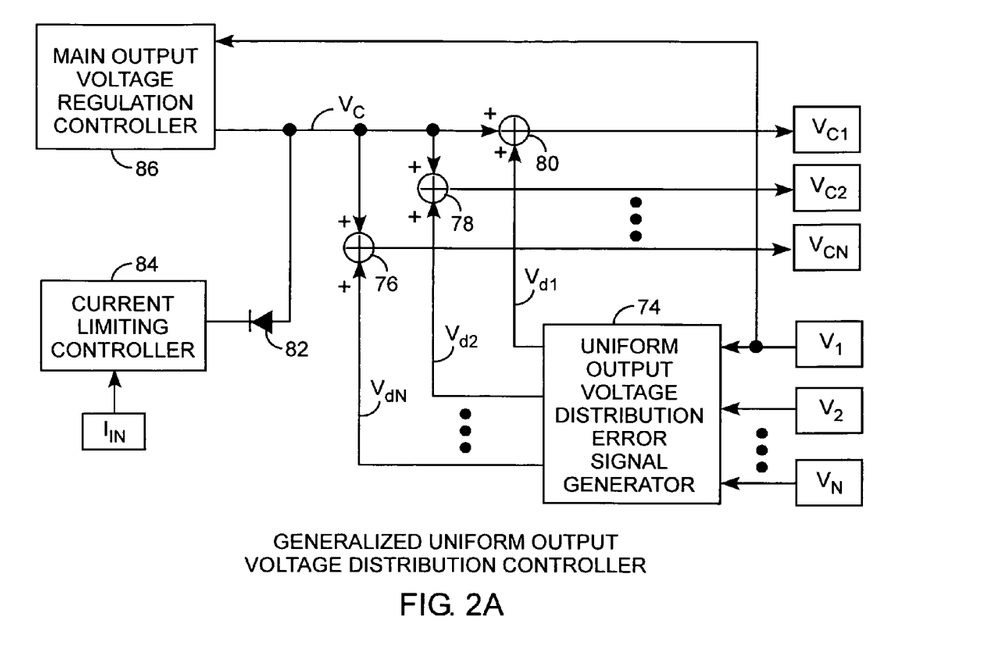
FIG. 2A is a block diagram of a generalized uniform output voltage distribution controller.

Referring to FIGS. 1 and 2A, and more particularly to FIG. 2A, the generalized uniform output voltage distribution controller includes a uniform output voltage distribution error signal generator 74 for regulating the parallel-input and series-output converter power system with uniform output voltage distribution. Under a generalized operation, the total system output voltage $V_1$ that is applied to the load 18 is regulated to a preset value by a main output voltage regulation controller 86 that senses the system output voltage $V_1$ and generates a regulation control voltage $V_C$. The control voltage $V_C$ is commonly used to control all of the converters 12a, 12b, and 12c to provide the same output voltage $V_{out1}$, $V_{out2}$, $V_{out3}$ that when summed by the series-output connection equals $V_1$ that is regulated at the predetermined output voltage driving the load 18. The distribution controller may further include a current limiting controller 84 that senses the input current $I_{IN}$. The regulated voltage control signal $V_C$ is connected to the current limiting controller 84 through a pull-down diode 82 commanding all the converters. When the current $I_{IN}$ exceeds a predetermined current limit value, the current limiting controller 84 pulls down the regulation control signal $V_C$ for reducing the control strength, and hence limit the current into the converters. Under a current overload condition that causes the current limiting controller to be active, the input current $I_{IN}$ is clamped to a value corresponding to the current-limiting threshold reference that is predetermined. The output of the activated current-limiting controller 84 effectively suppresses the primary regulation control signal $V_C$ through the pull-down diode 82 for reducing the system output voltage $V_1$ below the predetermined level and adequately clamping the input current $I_{IN}$ not to exceed a predetermined current-limiting value.

In the exemplar form, three converters 12a, 12b, and 12c are interconnected, but any N number of converters can be interconnected. Each converter provides an output voltage levels $V_1$, $V_2$, through $V_N$ at respective positive terminals, where N equals three in the exemplar form. In a series-output connection, output voltages $V_{out}$ of the converters are successively summed for producing successive output levels $V_1$ through $V_N$. As such, a uniform output voltage distribution error signal generator 74 receives the output voltage levels $V_1$, $V_2$ and $V_N$ and preferably provides respective error signals $V_{d1}$, $V_{d2}$, through $V_{dN}$. Each of the error signals $V_{d1}$, $V_{d2}$, through $V_{dN}$ are summed with the regulated control voltage $V_C$ for providing respective control signals $V_{C1}$, $V_{C2}$, through $V_{CN}$ using respective summers 80, 78, and 76. The control signals $V_{C1}$, $V_{C2}$, through $V_{CN}$ are routed through respective diodes, such as diodes 22a, 22b, through 22c. The diodes are routed to respective shared-bus inputs SBI of the converters, such as converters 12a, 12b, through 12c, so as to complete each voltage feedback loop for controlling the voltage of each of the converters.

Figure 2B:
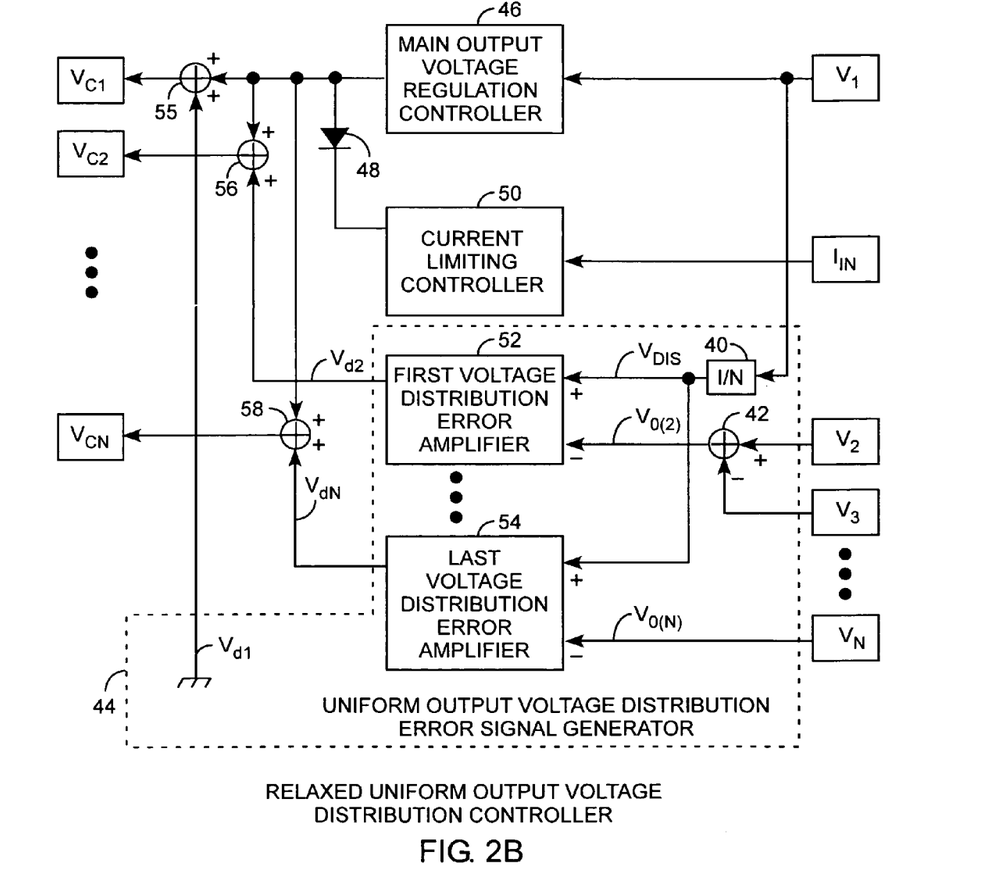
FIG. 2B is a block diagram of a relaxed uniform output voltage distribution controller.

Referring to FIGS. 1 and 2B, and more particularly to FIG. 2B, a relaxed uniform output voltage distribution controller includes a main output voltage regulation controller 46 sensing the system output voltage level $V_1$ and includes a current limiting controller 50 for sensing the input current $I_{IN}$. During an over current condition, the current limiting controller 50 pulls down the output of the regulation controller 46 through a pull down diode 48. In the relaxed controller configuration, one of the converters, such as converter 12a is directly controlled by the main output voltage regulation controller 46 generating $V_{C1}$ with the error signal $V_{d1}$ set to zero and shown connected to ground and added to regulation controller output using a summer 55. As such, the first error signal is a null error and summer 55 needs not be used. The relaxed uniform output voltage distribution controller also includes a uniform output voltage distribution error signal generator 44 having N−1 error amplifiers. In the case where N equals three for indicating the use of three converters, the amplifiers can be a first voltage distribution error amplifier 52 through a last voltage distribution error amplifier 54, as the amplifiers 52 through 54 produce respective error signals, such as error signals $V_{d2}$ through $V_{dN}$ that are respectively added to the output of the regulation controller 46 for providing control signals, such as control signals $V_{C2}$ through $V_{CN}$ using respective summers 56 through 58.

The system output voltage level $V_1$ is divided by N using a divider 40 for generating a distribution reference signal $V_{DIS}$ that is used to generate the error signals $V_{d2}$ through $V_{dN}$. The distribution reference signal $V_{DIS}$ is fed to the respective amplifiers 52 through 54. Output voltage difference signals are generated, such as $V_{o(1)}$, $V_{o(2)}$, through $V_{o(N)}$ where each difference signal is the difference of the two successive output voltage levels obtained from two successive series connected converters. The difference signal $V_{o(2)}$ is the difference between the second and third output voltage levels $V_2$ and $V_3$ using a summer 42. When a converter, such as the second converter 12b, is to provide an output voltage equal to the difference voltage $V_{DIS}=V_1/N$, the distribution reference signal $V_{DIS}$ and the difference voltage $V_{o(2)}$ are fed to an error amplifier, such as error amplifier 52 generating the error signal $V_{d2}$. Using a common distribution reference signal $V_{DIS}$, each of the converters can be separately controlled to provide the same output voltage. The output voltages are summed by the series-output connection to equal the system output voltage level $V_1$ so that each converter contributes an equal share of the system output voltage so as to distribute equally the power from each converter to the common load. In the relaxed uniform output voltage distribution controller, the first converter, such as converter 12a, is controlled by regulation controller 46, such that the first converter can provide an unequal share of the output power. The remaining converters, such as converters 12b and 12c provide an equal share of the output power both providing the same output voltage contribution to the system output voltage. In this way, one or more converters can be directly regulated having an unequal contribution with the remaining converters providing equal contribution to the system output voltage for providing equal contribution to delivered system power.

The common distribution reference signal $V_{DIS}$ is used to provide an internal reference for an individually distributed output voltage. The voltage difference between $V_{DIS}$ and each difference output voltage signal $V_{o(1)}$, $V_{o(2)}$, through $V_{o(N)}$ is amplified and preferably frequency-compensated. Finally, error signal is output as the voltage distribution control error signals $V_{d1}$, $V_{d2}$, through $V_{dN}$, respectively that provides the control correction for ensuring uniform output voltage distribution. Through shared-bus control feedback, the difference voltages $V_{o(N)}$ are driven to be equal and equal the common distribution reference signal $V_{DIS}$ so that each converter controlled by the common distribution reference signal $V_{DIS}$ produces the same equal output voltage and the equal contribution to the system output voltage $V_1$.

Figure 2C:
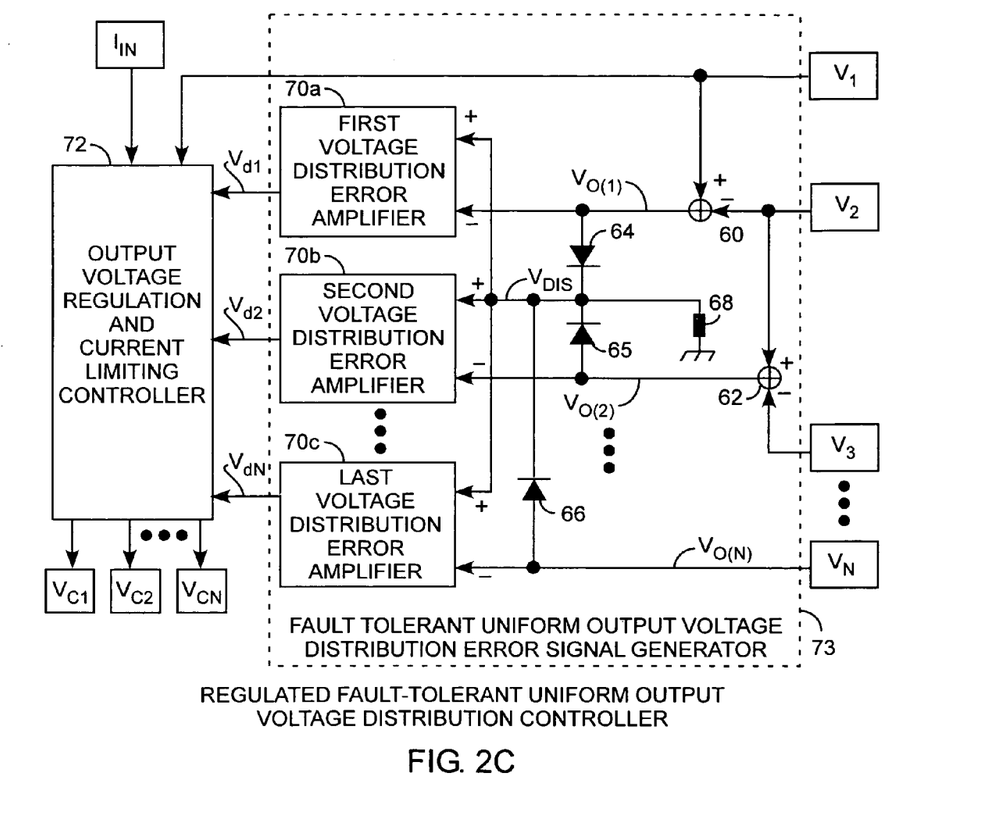
FIG. 2C is a block diagram of a regulated fault-tolerant uniform output voltage distribution controller.

Referring to FIGS. 1 and 2C, and more particularly to FIG. 2C, a fault-tolerant uniform output voltage distribution controller also receives the output voltage levels $V_1$, $V_2$, through $V_N$ that may be the output voltage level $V_3$ when three converters 12a, 12b, and 12c are used. The uniform output voltage distribution controller 20 is a fault-tolerant distribution controller. The controller 20 preferably includes an output voltage regulation and current limit controller 72 for receiving the error signals $V_{d1}$, $V_{d2}$, through $V_{dN}$ and sensed input current $I_{IN}$ and the system output voltage for generating the respective control signals $V_{C1}$, $V_{C2}$, through $V_{CN}$. The error signals $V_{d1}$, $V_{d2}$, through $V_{dN}$ are generated by a fault-tolerant uniform output voltage distribution error signal generator 73 that receives the output voltage levels $V_1$, $V_2$, through $V_N$. To achieve fault-tolerance, a set of N ideal rectifiers such as rectifiers 64, 65, through 66 connected to a bleed resister 68. Difference voltage signals $V_o$, such as $V_{o(1)}$, $V_{o(2)}$, through $V_{o(N)}$ are generated using respective N−1 summers, such as summers 60 and 62 where N equals the number of converters. The last output voltage level $V_N$ does not use a difference summer as the last output voltage is the output voltage of a last converter, such as converter 12c, having the negative terminal connected to ground, and hence, $V_{o(N)}$ is effectively a difference between $V_N$ and zero ground voltage. The N diodes, such as diodes 64, 65, through 66 are connected together for producing the common distribution reference signal $V_{DIS}$ that is the highest output voltage obtained from any one of the converters within the power system. The error signal generator 73 provides the error signals $V_{d1}$, $V_{d2}$, through $V_{dN}$ using first, second, through last voltage distribution error amplifiers 70a, 70b, through 70c receiving the common distribution reference signal $V_{DIS}$ and the respective difference voltages $V_0$. The error signals $V_{d1}$, $V_{d2}$, through $V_{dN}$ are fed to the regulation controller 72 for generating the voltage control signals $V_{C1}$, $V_{C2}$, through $V_{CN}$ with system output voltage regulation and input over current protection.

Once one of the converters fails to produce the output voltage, $V_{DIS}$ increases to compensate for loss of the output voltage of the failed converter. For the system to tolerate at least one converter failure, at least two ideal rectifiers are used, but up to N rectifiers, such as rectifiers 64, 65, through 66, can be used for sensing the remaining output voltages from the remaining converters, such as converters 12a and 12b. The number of tolerated converter failures is equal to N−2, such that, a power system could tolerate more than one converter failure using more than three rectifiers and converters. For the power system to tolerate at least one converter failure in a three-converter power system, the two ideal rectifiers, such as rectifiers 64 and 65 individually sense the output voltages from any two converters, such as converters 12a and 12b. Up to N ideal rectifiers are included in the uniform output voltage distribution controller for an N converter parallel-input and series-output power system. At a minimum, there are at least two ideal rectifiers used in the error signal generator. There can be up to and preferably N ideal rectifiers used for the parallel-input and series-output N-converter power system. In the case where $V_3$ equals $V_N$ in a three converter power system, where the third converter 12c fails, the third voltage level $V_3$, that is $V_N$, drops to zero volts that produces an increase in $V_{O(2)}$, that increases the common distribution reference signal $V_{DIS}$, that produces an increase in the error signals $V_{d1}$ and $V_{d2}$, that produces an increase in the control voltages $V_{C1}$ and $V_{C2}$ that then increases the output voltages of the first two converters 12a and 12b so as to compensate for the lost of the third failed converter 12c. In this manner, the power system can be fault tolerant in the presence of a failed converter.

Figure 3A:
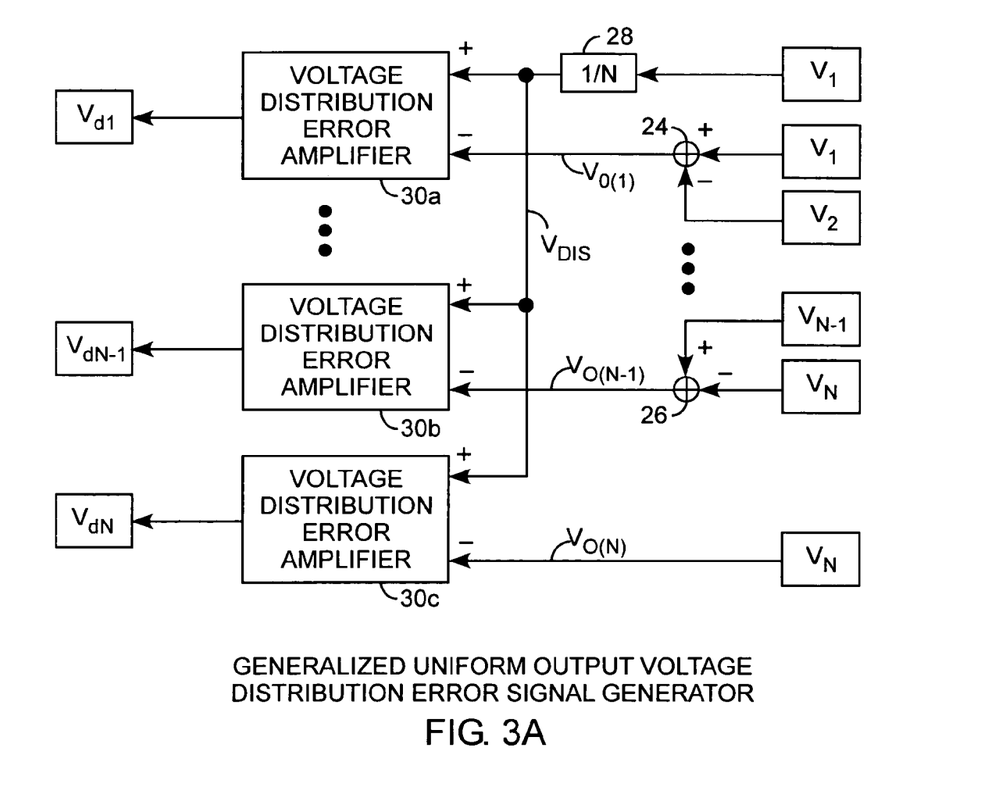
FIG. 3A is a block diagram of a generalized uniform output voltage distribution error signal generator.

Referring to FIGS. 1, 2A, and 3A, a generalized uniformed voltage distribution error signal generator may be used as the error signal generator 74 for generating the error signals $V_{d1}$, $V_{d2}$, through $V_{dN}$, such as error signal $V_{d1}$, through $V_{dN-1}$ and $V_{dN}$ when receiving voltage levels $V_1$, $V_2$, $V_{N-1}$ and VN voltage levels for a power system having N converters. In the case of three converters 12a, 12b, and 12c, the voltage level $V_{N-1}$ is $V_2$, the voltage level $V_N$ is $V_3$, the error signal $V_{dN-1}$ is $V_{d2}$, and the error signal $V_{dN}$ is $V_{d3}$. Difference signals $V_{O(1)}$, $V_{O(N-1)}$, and $V_{O(N)}$ are equal to $V_{O(1)}$, $V_{O(2)}$, and $V_{O(3)}$ in a three-converter system. The system output voltage level $V_1$ is divided by N using a voltage divider 28 for producing the common distribution reference signal $V_{DIS}$. In the case of a three-converter system, the common distribution reference signal is $V_1/3$. The difference between voltage levels $V_1$ and $V_2$ is provided by a summer 24 for producing the difference signal $V_{O(1)}$, which difference is equal to output voltage provided by only the first converter 12a. The difference between voltage levels $V_2$ and $V_3$ is provided by a summer 26 for producing the difference signal $V_{O(2)}$, which difference is equal to output voltage provided by only the second converter 12b. The difference between $V_3$ and ground and is the difference signal $V_{O(3)}$, which difference is equal to output voltage provided by only the third converter 12c. Voltage distribution error amplifiers 30a, 30b, and 30c each receives the common distribution reference signal $V_{DIS}$ and the respective difference signals $V_O$ for providing the respective error signals $V_d$. As such, each of the converters, such as converters 12a, 12b, and 12c are controlled to have the same output voltage by producing voltage error signals to regulate the converter output voltages to be exactly a 1/N contribution, such as a ⅓ contribution to the total system output voltage level $V_1$ that is also the system output voltage. As such, each converter 12a, 12b, and 12c will each produce the same ⅓ power for equal uniform power distribution between the three converters 12a, 12b, and 12c.

Figure 3B:
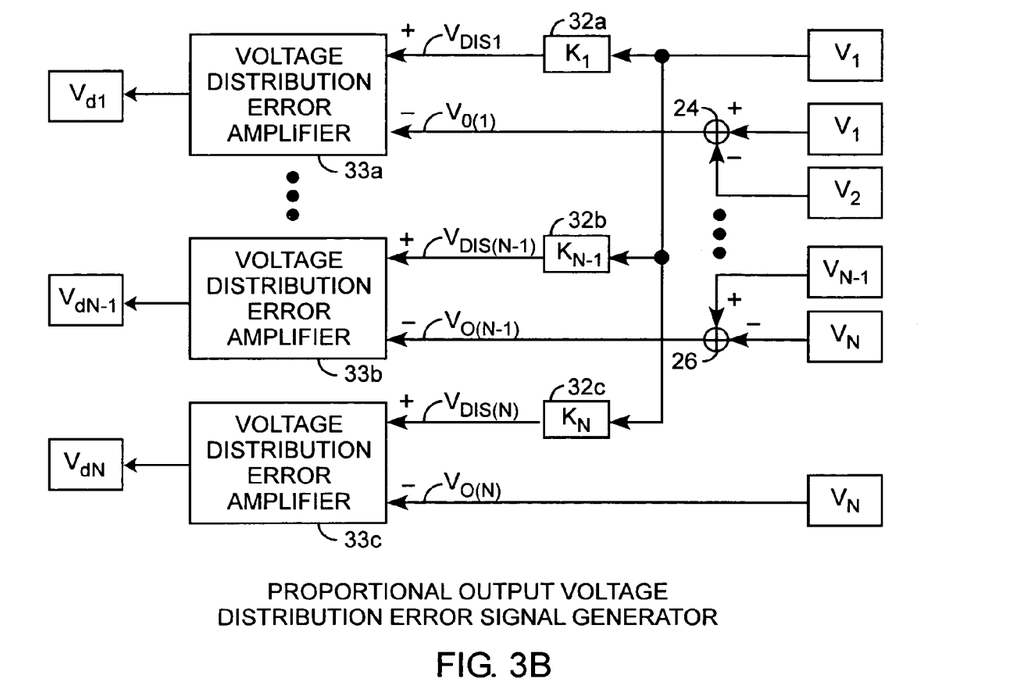
FIG. 3B is a block diagram of a proportional output voltage distribution error signal generator.

Referring to FIGS. 1, 2A, and 3B, and more particularly to FIG. 3B, a proportional voltage distribution error signal generator may be used as the error signal generator 74 for generating the error signals $V_{d1}$, $V_{d2}$, through $V_{dN}$, such as error signal $V_{d1}$, $V_{dN-1}$, through $V_{dN}$ when receiving voltage levels $V_1$, $V_2$, $V_{N-1}$, through $V_N$ voltage signals for a power system having N converters. In the case of three converters 12a, 12b, and 12c, the voltage level $V_{N-1}$ is $V_2$, the voltage level $V_N$ is $V_3$, the error signal $V_{dN-1}$ is $V_{d2}$ and the error signal $V_{dN}$ is $V_{d3}$. Difference signals $V_{O(1)}$, $V_{O(N-1)}$, and $V_{O(N)}$ are equal to $V_{O(1)}$, $V_{O(2)}$, and $V_{O(3)}$ in a three-converter system.

For proportional output voltage distribution, each of the converter output voltage levels $V_1$, $V_{N-1}$ through $V_N$ are scaled by respective scalars, such as a $K_1$ scalar 32a, $K_{N-1}$ scalar 32b, through a $K_N$ scalar 32c. The scalars 32a, 32b, through 32c provide proportional voltage distribution reference signals $V_{DIS1}$, $V_{DIS(N-1)}$, through $V_{DIS(N)}$. In the case of three converters 12a, 12b, and 12c, three proportional voltage distribution reference signals $V_{DIS1}$, $V_{DIS2}$, and $V_{DIS3}$ are respectively produced by three scalars 32a, 32b, and 32c. In the case of three converters, 12a, 12b, and 12c, the difference voltage $V_{O(1)}$, $V_{O(N-1)}$, through $V_{O(N)}$ are difference signal $V_{O(1)}$, $V_{O(2)}$, and $V_{O(3)}$, and the error signals $V_{d1}$, $V_{dN-1}$, through $V_{dN}$ are error signals $V_{d1}$, $V_{d2}$, and $V_{d3}$. The proportional voltage distribution reference signals, such as proportional voltage distribution reference signals $V_{DIS1}$, $V_{DIS2}$, and $V_{DIS3}$, are fed into respective error amplifiers 33a, 33b, and 33c respectively receiving difference voltages $V_{d1}$, $V_{d2}$, and $V_{d3}$. The proportional output voltage distribution error signal generator enables the parallel-input series-output connections a mix of different power-rating converters in the power system with each converter having a respectively scaled output voltage. The proportional distribution output voltage references, $V_{DIS1}$, $V_{DIS2}$, through $V_{DISN}$ can be summed as a $V_{DIS-Total}$ value where each converter provides a $V_{DISi}/V_{DIS-Total}$ proportional contribution to the total power delivered by the power system. Preferably, $V_{DIS-total}$ equals $V_{DIS1}$, plus $V_{DIS2}$ through $V_{DISN}$, or that, summation of scalars K1 through KN equals one, but various combinations of scalars and resulting power contributions can be used. The proportional contribution can be set by the scalars 32a, 32b, through 32c so that the converters do not exceed respective rated power levels when a mix of converters having different output voltage and power ratings are used.

The proportional output voltage distribution power system uses proportional output voltage distribution error signal generation. The proportional output voltage distribution power system output voltage $V_1$ is multiplied by respective K scalars 32a, 32b, and 32c for producing the proportional distribution reference signals $V_{DIS(i)}$, I=1, 2, to N. The difference between voltage levels $V_1$ and $V_2$ is provided by a summer 24 for producing the difference signal $V_{O(1)}$, which difference is equal to output voltage level provided by only the first converter 12a. The difference between voltage levels $V_2$ and $V_3$ is provided by a summer 26 for producing the difference signal $V_{O(2)}$, which difference is equal to output voltage provided by only the second converter 12b. The difference between voltage level V3 and ground is the difference signal $V_{O(3)}$, which difference is equal to output voltage provided by only the third converter 12c. Voltage distribution error amplifiers 33a, 33b, and 33c individually receives the respective distribution reference signals $V_{DIS}$ and the respective difference signals $V_O$ for providing the respective error signals $V_d$. As such, each of the converters, such as converters 12a, 12b, and 12c are controlled to have the different output voltages by producing proper voltage error signals so that each of the converter output voltages provides a respective proportional contribution to the total power. As such, each converter 12a, 12b, and 12c will each provide a different amount of power for proportional output voltage distribution among the three converters 12a, 12b, and 12c that have different output voltage and power ratings.

The invention is directed to parallel-input series-output power system having a plurality of converters, each of which delivers a tightly controlled portion of the total output power using voltage levels from all participating converters and difference signals representing the sensed output voltages of the converters. The converters are preferably controlled by shared-bus inputs and operate in a current mode. In the generalized form, each of the converters provides an equal share of the total system voltage and hence an equal share of the total power delivered. In an alternative form, each converter is proportionately controlled to provide a proportionate contribution to the total power delivered. In another alternative form, at least one of the converters is controlled to a safe and relaxed power level while the remaining converters are controlled to equal power levels so as to relax system requirements for equally contributing converters. The power system can provide voltage regulation as well as over current protection. The uniform output voltage distribution for parallel-input, series-output power converter power system has been validated to control the power contribution of the respective converters. Employing the uniform output voltage distribution control in parallel-input and series-output converter power system, burn-in or functional testing of various power converters can be efficiently and concurrently conducted in a single power system.

Fault tolerant capabilities are obtainable in applications where redundant power supplies are necessary but effectively embedded in a single power system. The fault-tolerant parallel-input series-output converter power system preserves uniform output voltages even when one converter fails to produce an output voltage. The system enables power expansion with other power system configurations such as a parallel-input parallel-output converter power system. The power system has an error generator for generating respective error signal for each converter so that each converter produces exactly the same output voltage and output power in the presence of minor component mismatches. The invention can be applied to accommodate power system expansion without changing the design of the basic converters. The system can be applied to multiple power level satellite power systems. The system can be applied to arrays of stacked-output converters for providing high voltages. The system can be applied to battery testing and charging where battery charger power supplies consisting of series-output connected converters are being controlled for uniform voltage equalization among series connected battery cells or banks. The system can be applied to solar array voltage equalizers among series connected solar array panels that have nearly the same peak power voltage but different peak power ratings. The preferred forms have two choices of control: equal and proportional power control, but a mix of both control choices for equal and proportional power control of the converters can be used. Those skilled in the art can make enhancements, improvements, and modifications to the invention, and these enhancements, improvements, and modifications may nonetheless fall within the spirit and scope of the following claims.

What is claimed is:

1. A power system for providing a system output voltage from an input voltage, the system comprising
    converters with parallel-input connections for receiving the input voltage providing an input current and with series-output connections for providing a series of successive respective voltage levels between ground and the system output voltage, the converters providing successive respective output voltages that are summed together by the series-output connections for providing the system output voltage, the converters have respective control ports for controlling the successive respective output voltages, and
    a controller for receiving the successive respective voltage levels from each of the converters and for providing respective converter control signals communicated to the respective control ports for controlling the successive respective output voltages and for maintaining the system output voltage at a predetermined voltage with each of the converters contributing to the system output voltage by the respective output voltages, the controller generating one or more difference signals from the successive voltage levels, the difference signals equaling to the successive respective output voltages, the controller generating one or more error signals from the one or more difference signals and one or more distribution reference signals, the one or more distribution reference signals controlling power contribution of the converters.

2. The power system of claim 1 wherein the controller comprises an error signal generator for generating the error signals, the generator comprising,
    summers for receiving the successive respective voltage levels and providing the difference signals, and
    amplifiers for receiving the difference signals and the one or more distribution reference signals for generating the error signals.

3. The power system of claim 1 wherein
    the controller comprises an error signal generator for generating the error signals,
    the converters are three converters respectively providing a first output voltage and a second output voltage and a third output voltage for respectively providing a first voltage level and a second voltage level and a third voltage level,
    the error signal generator comprises summers and amplifiers, the summer for receiving the successive respective voltage levels and providing the difference signals,
    the summers comprise at least a first summer for providing a first difference signal between first and second voltage levels and a second summer for providing a second difference signal between the second and third voltage levels, a third difference signal being the third voltage level, the amplifiers for receiving the difference signals and the one or more distribution signals for generating the error signals.

4. The power system of claim 1 wherein
the controller comprises an error signal generator for generating the error signals,
the converters are N converters respectively providing a first output voltage and a second output voltage up to a last N-th output voltage for respectively providing a first voltage level and a second voltage level up to a last N-th voltage level,
the error signal generator comprises summers and amplifiers, the summers for receiving the successive respective voltage levels and providing the difference signals,
the summers comprise at least a first summer for providing a first difference signal between first and second voltage levels and a second summer for providing a second difference signal between the second and third voltage levels up to a last difference signal being the last voltage level, the amplifiers for receiving the difference signals and the one or more distribution reference signals for generating the error signals, and
the one or more distribution reference signals is a common distribution reference equal to the system output voltage divided by N for equal uniform control of the converters.

5. The power system of claim 1 wherein
the controller comprises an error signal generator for generating the error signals,
the converters are N converters respectively providing a first output voltage and a second output voltage up to a last output voltage for respectively providing a first voltage level and a second voltage level up to a last voltage level,
the error signal generator comprises summers and amplifiers, the summers for receiving the successive respective voltage levels and providing the difference signals,
the summers comprise at least a first summer for providing a first difference signal between first and second voltage levels and a second summer for providing a second difference signal between the second and third voltage levels up to a last difference signal being the last voltage level, the amplifiers for receiving the difference signals and the one or more distribution reference signals for generating the error signals, and
the one or more distribution reference signals are scaled distribution references equal to the system output voltage multiplied by respective scalars for proportional voltage distribution control of the converters.

6. The power system of claim 1 wherein
the controller comprises an error signal generator for generating the error signals,
the converters are N converters respectively providing a first output voltage and a second output voltage up to a last output voltage for respectively providing a first voltage level and a second voltage level up to a last voltage level,
the error signal generator comprises summers and amplifiers, the summers for receiving the successive voltage levels and providing the respective difference signals,
the summers comprise at least a first summer for providing a first difference signal between first and second voltage levels and a second summer for providing a second difference signal between the second and third voltage levels up a last difference signal being the last voltage level, the amplifiers for receiving the difference signals and a distribution reference signal for generating the error signals, and
the distribution reference signal is a common distribution signal equal to a maximum one of anyone of difference signals.

7. The power system of claim 1 wherein
the controller comprises an error signal generator for generating the error signals,
the converters are N converters respectively providing a first output voltage and a second output voltage up to a last output voltage for respectively providing a first voltage level and a second voltage level up to a last voltage level,
the error signal generator comprises summers and amplifiers, the summers for receiving the successive respective voltage levels and providing the difference signals,
the summers comprise at least a first summer for providing a first difference signal between first and second voltage levels and a second summer for providing a second difference signal between the second and third voltage levels up a last difference signal being the last voltage level, the amplifiers for receiving the difference signals and a distribution reference signal for generating the error signals, and
the distribution reference signal is a common distribution reference signal equal to a maximum one of anyone of the difference signals, the system output voltage being maintained at the predetermined system output voltage in the presence of a failure of anyone of the converters.

8. The power system of claim 1 wherein
the controller comprises an error signal generator for generating the error signals,
the converters are N converters respectively providing N output voltages for respectively providing N voltage levels,
the error signal generator comprises summers and amplifiers, the summers for receiving the successive voltage levels and providing the respective difference signals,
the summers providing N−1 difference signals between successive pairs of the successive voltage levels,
A last one of the difference signals is the last voltage level with respect to ground,
the amplifiers for receiving the N−1 difference signals and the one or more distribution reference signals for generating the error signals.

9. The power system of claim 1 wherein
the controller comprises an error signal generator for generating the error signals,
the controller comprises a voltage regulator for providing a common regulation control signal for regulating the system output voltage by distributing the common regulation control signal as a basic portion within the control signals that precisely control the converters in spite of the minor component mismatches existing among the converters,
the converters are N converters respectively providing N output voltages for respectively providing N voltage levels,
the error signal generator comprises one or more summers and one or more amplifiers, the summers for receiving the successive voltage levels and providing the respective N−1 difference signals,
the summers providing the N−1 difference signals between successive pairs of the successive voltage levels,
the amplifiers are N−1 amplifiers for receiving the N−1 difference signals and the one or more distribution reference signals for generating the N−1 error signals, the controller comprises adders each of which is for adding the common regulation control signal to each of the N−1 error signals for providing N−1 converter control signals, the common regulation control signal also being a complete control signal for one converter.

10. The power system claim 1 wherein, the controller comprises a voltage regulator for regulating the system output voltage, the regulator receives the system output voltage and generates a common regulation control signal, and regulation summers respectively summing the common regulation control signal and the respective error signals for providing the respective control signals.

11. The power system claim 1 wherein, the controller comprises a voltage regulator for regulating the system output voltage, the regulator receives the system output voltage and generates a common regulation control signal, a current limiter for sensing input current from the input voltage to the converters and for reducing the common regulation control signal when the input current exceeds a predetermined current, and regulation summers respectively summing the regulation control signal and the respective error signals for providing the respective control signals.

12. The power system of claim 1 wherein, the converters provide electrical isolation between inputs of the converters receiving the input voltage and outputs of the converters providing the output voltages.

* * * * *